US012534655B2

(12) United States Patent
Low

(10) Patent No.: US 12,534,655 B2
(45) Date of Patent: Jan. 27, 2026

(54) COMPOSITIONS

(71) Applicant: Mexichem Fluor S.A. de C.V., San Luis Potosi (MX)

(72) Inventor: Robert E. Low, Runcorn (GB)

(73) Assignee: Mexichem Fluor S.A. de C.V., San Luis Potosi (MX)

( * ) Notice: Subject to any disclaimer, the term of this patent is extended or adjusted under 35 U.S.C. 154(b) by 811 days.

(21) Appl. No.: 17/795,436

(22) PCT Filed: Feb. 12, 2021

(86) PCT No.: PCT/GB2021/050348
§ 371 (c)(1),
(2) Date: Jul. 26, 2022

(87) PCT Pub. No.: WO2021/161037
PCT Pub. Date: Aug. 19, 2021

(65) Prior Publication Data
US 2023/0105619 A1    Apr. 6, 2023

(30) Foreign Application Priority Data
Feb. 14, 2020    (GB) .................................... 2002052

(51) Int. Cl.
*C09K 5/04*    (2006.01)
(52) U.S. Cl.
CPC ........ *C09K 5/044* (2013.01); *C09K 2205/106* (2013.01); *C09K 2205/122* (2013.01); *C09K 2205/126* (2013.01)
(58) Field of Classification Search
CPC .............. C09K 5/044; C09K 2205/106; C09K 2205/122; C09K 2205/126; C09K 2205/40; C09K 5/045; F25B 9/006
See application file for complete search history.

(56) References Cited

U.S. PATENT DOCUMENTS

| | | | |
|---|---|---|---|
| 5,736,063 A | 4/1998 | Richard et al. | |
| 7,238,299 B2 | 7/2007 | Singh et al. | |
| 10,144,855 B2 | 12/2018 | Saito et al. | |
| 2005/0044885 A1 | 3/2005 | Pearson | |
| 2011/0162410 A1 | 7/2011 | Low | |
| 2014/0222699 A1 | 8/2014 | Low | |
| 2015/0315446 A1 | 11/2015 | Yana Motta et al. | |
| 2016/0178246 A1 | 6/2016 | Toyooka et al. | |
| 2016/0187038 A1 | 6/2016 | Toyooka | |
| 2016/0215193 A1 | 7/2016 | Low | |
| 2016/0340565 A1 | 11/2016 | Tasaka et al. | |
| 2018/0320041 A1 | 11/2018 | Zou et al. | |
| 2019/0085224 A1* | 3/2019 | Sethi ....................... | C09K 5/044 |
| 2020/0283666 A1 | 9/2020 | Aydin et al. | |
| 2020/0283667 A1 | 9/2020 | Aydin et al. | |
| 2021/0261840 A1 | 8/2021 | Low | |
| 2021/0395589 A1* | 12/2021 | Low ................... | C10M 171/008 |
| 2021/0403777 A1 | 12/2021 | Low | |
| 2022/0127507 A1 | 4/2022 | Low | |
| 2023/0022894 A1 | 1/2023 | Parrabi et al. | |
| 2023/0082725 A1 | 3/2023 | Low | |
| 2023/0123381 A1 | 4/2023 | Low | |
| 2024/0247175 A1 | 7/2024 | Rached | |

FOREIGN PATENT DOCUMENTS

| | | |
|---|---|---|
| CN | 101914368 A | 12/2010 |
| CN | 103781872 A | 5/2014 |
| CN | 105462564 A | 4/2016 |
| CN | 108070360 A | 5/2018 |
| CN | 108070361 A | 5/2018 |
| CN | 109666457 A | 4/2019 |
| CN | 111662685 A | 9/2020 |
| CN | 112996879 A | 6/2021 |
| CN | 113677774 A | 11/2021 |
| CN | 114929832 A | 8/2022 |
| CN | 116656323 A | 8/2023 |
| EP | 0 770 112 B1 | 4/1999 |
| EP | 0 770 113 B1 | 4/1999 |
| GB | 2480517 A | 11/2011 |
| GB | 2576328 A | 2/2020 |
| JP | H06220435 A | 8/1994 |
| JP | H0867870 A | 3/1996 |
| JP | 201116822 A | 6/2011 |
| JP | 2013-533896 A | 8/2013 |
| JP | 2020-143279 A | 9/2020 |
| JP | 2020143280 A | 9/2020 |
| WO | WO 96/02606 A1 | 2/1996 |
| WO | WO 2015/045355 A1 | 4/2015 |
| WO | WO 2017/151488 A1 | 9/2017 |
| WO | WO 2019/030508 A1 | 2/2019 |
| WO | WO 2019/074735 A1 | 4/2019 |
| WO | WO 2019074734 A1 | 4/2019 |
| WO | WO 2019/099961 A1 | 5/2019 |
| WO | WO 2019/102003 A1 | 5/2019 |
| WO | WO 2019/102008 A1 | 5/2019 |
| WO | WO 2019/117213 A1 | 6/2019 |
| WO | WO 2019/234353 A1 | 12/2019 |
| WO | WO 2019/240205 A1 | 12/2019 |
| WO | WO 2020/017522 A1 | 1/2020 |
| WO | WO 2020/035689 A1 | 2/2020 |
| WO | WO 2020/035690 A1 | 2/2020 |
| WO | WO 2020/165569 A1 | 8/2020 |

OTHER PUBLICATIONS

International Search Report for International application No. PCT/GB2021/050334, mailed May 10, 2021.
International Search Report for International Application No. PCT/GB2021/050346 mailed May 17, 2021.
International Search Report for International Application No. PCT/GB2021/050347 mailed May 20, 2021.
International Search Report for International Application No. PCT/GB2021/050348 mailed May 25, 2021.
Written Opinion of the International Searching Authority for International application No. PCT/GB2021/050334, mailed May 10, 2021.

(Continued)

*Primary Examiner* — Andrew J. Oyer
(74) *Attorney, Agent, or Firm* — Crowell & Moring LLP

(57) ABSTRACT

The invention provides a composition comprising carbon dioxide ($CO_2$, R-744), difluoromethane (R-32) and trifluoroiodomethane ($CF_3I$) and the use of such a composition as a working fluid in a heat transfer system, such as a refrigeration, heat pump or air-conditioning system.

31 Claims, No Drawings

(56) References Cited

OTHER PUBLICATIONS

Written Opinion of the International Searching Authority for International Application No. PCT/GB2021/050346 mailed May 17, 2021.

Written Opinion of the International Searching Authority for International Application No. PCT/GB2021/050347 mailed May 20, 2021.

Written Opinion of the International Searching Authority for International Application No. PCT/GB2021/050348 mailed May 25, 2021.

Adams, Robert A., et al., Vapor-Liquid Equilibria for Carbon Dioxide-Difluoromethane System, Journal of Chemical and Engineering Data, vol. 16, No. 2, 1971, pp. 146-149.

Office Action dated Aug. 19, 2024, issued in Chinese Patent Application No. 202180012152.1, w/English translation, 26 pages.

Office Action dated Oct. 7, 2024, issued in Japanese Patent Application No. 2022-548077, w/English translation, 14 pages.

Japanese-language Office Action issued in Japanese Application No. 2022-548564 dated Nov. 20, 2024 with English translation (8 pages).

Great Britain Search Report, dated August 17, 2020, pp. 1-5, issued in GB Patent Application No. GB2002063.2, Intellectual Property Office, Newport, South Wales, UK.

Chinese-language Office Action issued in Chinese Application No. 202180012129.2 dated Dec. 2, 2024, with English translation (25 pages).

Office Action dated Oct. 7, 2024, issued in Japanese Patent Application No. 2022-548253 w/English translation, 13 pages Nicola, Giovanni Di, et al., Blends of Carbon Dioxide and HFCs as Working Fluids for the Low-temperature Circuit in Cascade Refrigerating Systems, International Journal of Refrigeration, 28 (2005), pp. 130-140, ScienceDirect.com \* cited by examiner

COMPOSITIONS

CROSS-REFERENCE TO RELATED APPLICATIONS

This application is the U.S. National Stage application of PCT application no. PCT/GB2021/050348, filed on Feb. 12, 2021, titled COMPOSITIONS, designating the United States, which claims priority to Great Britain application no. 2002052.5, filed on Feb. 14, 2020, the contents of which are each incorporated herein by reference in their entirety.

The present invention relates to compositions suitable for use as working fluids in air-conditioning and refrigeration applications. The compositions disclosed herein are especially useful in heat pump water heaters, air-conditioning systems for trains, buses, cars and trucks, commercial refrigeration systems including supermarket display systems and cold rooms (such as walk-in fridges and freezers), and transportation refrigeration systems.

The listing or discussion of a prior-published document or any background in the specification should not necessarily be construed as an acknowledgement that a document or background is part of the state of the art or is common general knowledge.

Carbon dioxide ($CO_2$, R-744) is finding favour as a low Global Warming Potential (GWP) refrigerant for applications where non-flammability of refrigerant is required. These applications include air-conditioning systems for trains, buses, cars and trucks; heat pump-water heater systems; commercial refrigeration systems including supermarket display systems and cold-rooms, and transportation refrigeration systems fitted to refrigerated shipping containers or trucks.

$CO_2$ has two main disadvantages compared to other fluorocarbon refrigerants in use in the same applications. Firstly, it suffers from low energy efficiency in ambient temperatures of above about 25 to 30° C. Secondly, its operating pressures are much higher than those of traditional fluorocarbon-based systems.

Non-flammable refrigerant mixtures comprising difluoromethane (R-32) and $CO_2$ have been proposed (see Adams et al. (J. Chem. Eng. Data 16 (1971) 146-149) and U.S. Pat. No. 7,238,299, the contents of which are incorporated herein by reference in their entirety). Such non-flammable compositions can contain up to about 60% R-32 by weight.

However, such binary refrigerant compositions, whilst non-flammable as formulated, would still be considered as flammable according to ASHRAE Standard 34 (2019). This is because the mixtures are non-azeotropic. ASHRAE Standard 34 requires that the outcome of a series of vapour leakage experiments at a range of temperatures from −40° C. to 60° C. is considered to identify whether leakage can generate a more flammable composition than the "as-formulated" composition. When this is done for non-flammable binary mixtures of R-32 with $CO_2$, a vapour leakage at −40° C. will result in generation of a flammable composition, as the more volatile $CO_2$ is preferentially removed from the system, causing fractionation of the remaining material so that it contains more than 60% R-32.

Therefore, it would be desirable to identify refrigerant compositions which address these problems, whilst preferably retaining the non-flammability of pure $CO_2$. Such compositions should preferably also have a low GWP. In particular, a GWP of about 150 or less would be required under the European Union F-Gas Regulations for certain applications, such as air-conditioning systems in passenger cars or self-contained refrigeration appliances.

The present invention addresses the above and other deficiencies, and the above needs, by the provision of a composition comprising carbon dioxide ($CO_2$, R-744), difluoromethane (R-32), trifluoroiodomethane ($CF_3I$), and, optionally, 1,1-difluoroethylene (R-1132a). Such compositions will be referred to hereinafter as "the compositions of the (present) invention".

The present inventor has found that relatively minor amounts of $CF_3I$ may be added to R-744 and R-32 to ensure that the resulting mixture will not fractionate to a flammable composition when analysed according to the ASHRAE Standard 34 protocol. Furthermore, minor amounts of a flammable species (e.g. R-1132a) may also be added to the mixtures of the present invention without generating a flammable composition.

The compositions of the present invention are believed to be especially useful in heat transfer systems (e.g. refrigeration, air-conditioning and heat pump systems) utilising a transcritical refrigeration cycle. The basic transcritical cycle consists of the following steps:

(a) Evaporation of a liquid refrigerant at low pressure to remove heat from a low temperature source fluid (such as air);

(b) Compression of the resultant refrigerant vapour in a compressor to yield a hot, high pressure gas;

(c) Cooling of the high-pressure gas by heat exchange with a sink fluid, at higher temperature than the source, to yield a cooler, dense refrigerant gas at high pressure. This gas is said to be a "supercritical" fluid, since it is above its critical temperature; and (d) Expansion of the supercritical fluid through an expansion valve or other restriction device to give a two-phase mixture of liquid refrigerant with vaporised refrigerant vapour at low pressure; this mixture is then fed back to the evaporator stage (a) to complete the cycle.

Optionally, in such a cycle there occurs an internal heat exchange process between the warm high-pressure gas leaving the gas cooler, and the cool vapour flowing from the evaporator to the compressor. This process takes place in an "internal heat exchanger" ("IHX") and has the effect of boosting the refrigeration capacity and efficiency of the cycle.

Conveniently, such a transcritical refrigeration cycle may contain a liquid accumulator positioned after the evaporator (and before the IHX, if one is used). This serves to hold excess charge of refrigerant when the external ambient temperature is such that the gas cooler pressure is reduced.

The compositions of the present invention have also been found to be suitable for use in such cycles, whether incorporating IHX or accumulator features or not.

The compositions of the present invention will now be described in detail.

According to the present invention, there is provided a composition comprising $CO_2$, R-32 and $CF_3I$.

Typically, the compositions of the present invention comprise from about 50 to about 98 weight $CO_2$, such as from about 52 or about 55 to about 95 weight %, for example from about 59 to about 92 weight %, preferably from about 65 or 70 to about 90 weight %, optionally from about 75 to about 87 weight %.

Conveniently, the compositions of the invention comprise from about 1 to about 30 weight R-32, such as from about 2 to about 25 weight %, for example from about 3 to about 21 weight %, optionally from about 3 to about 15 weight %.

Advantageously, the compositions of the invention comprise from about 1 or 2 to about 20 weight % $CF_3I$, such as from about 3 to about 15 or about 13 weight %.

Typically, the compositions of the present invention comprise from about 50 to about 98 weight % $CO_2$, from about 1 to about 30 weight % R-32 and from about 1 to about 20 weight % $CF_3I$, such as from about 55 to about 90 weight % $CO_2$, from about 2 to about 28 weight % R-32 and from about 2 to about 17 weight % $CF_3I$, for example from about 57 to about 85 weight % $CO_2$, from about 2 to about 26 weight % R-32 and from about 3 to about 17 weight % $CF_3I$.

The compositions of the present invention may additionally comprise R-1132a.

When present, the compositions of the present invention typically comprise from about 1 or about 2 to about 20 weight % R-1132a, such as from about 4 to about 17 weight %, for example from about 7 to about 16 weight %, optionally from about 10 to about 15 weight %.

Advantageously, the amount of R-1132a is selected so that the compositions of the present invention comprise R-32 and R-1132a in a combined amount of less than about 37 weight %, such as less than about 35 weight %.

Conveniently, the compositions of the present invention comprise R-32 and $CF_3I$ in a weight ratio of R-32 to $CF_3I$ of less than about 2:1, such as less than about 1.8:1.

The compositions of the invention may additionally comprise a further component selected from 1,1,1,2-tetrafluoroethane (R-134a), trans-1,3,3,3-tetrafluoropropene (R-1234ze(E)), 2,3,3,3-tetrafluoropropene (R-1234yf), 1,1,1,2,3,3,3-heptafluoropropane (R-227ea) and mixtures thereof.

Typically, the further component is R-134a or R-134a and one or more of R-1234yf and R-1234ze(E). Alternatively, the compositions may additionally comprise one or more of R-1234yf and R-1234ze(E) as a further component.

Conveniently, the compositions of the present invention comprise from about 1 about 15 weight of the further component(s), such as from about 3 to about 12 weight %, for example from about 4 or about 5 to about 10 weight %.

In one embodiment, the compositions of the present invention consist essentially of the stated components. By the term "consist essentially of", we include the meaning that the compositions of the invention contain substantially no other components, particularly no further (hydro)(fluoro) compounds (e.g. (hydro)(fluoro)alkanes or (hydro)(fluoro) alkenes)) known to be used in heat transfer compositions. The term "consist of" is included within the meaning of "consist essentially of".

In one embodiment, the compositions of the invention are substantially free of any component that has heat transfer properties (other than the components specified). For instance, the compositions of the invention may be substantially free of any other hydrofluorocarbon compound.

By "substantially no" and "substantially free of" we include the meaning that the compositions of the invention contain 0.5% by weight or less of the stated component, preferably 0.4%, 0.3%, 0.2%, 0.1% or less, based on the total weight of the compositions.

As used herein, all % amounts mentioned in the compositions herein, including in the claims, are by weight based on the total weight of the composition, unless otherwise stated.

By the term "about", as used in connection with numerical values of amounts of component in by weight, we include the meaning of ±0.5 weight %, for example ±0.2 weight %.

For the avoidance of doubt, it is to be understood that the stated upper and lower values for ranges of amount of components in the compositions of the invention described herein may be interchanged in any way, provided that the resulting ranges fall within the broadest scope of the invention.

The compositions of the present invention have zero ozone depletion potential.

Typically, the compositions of the present invention have a Global Warming Potential (GWP) which is less than 220, such as less than about 210 or less than about 200, for example less than about 150, preferably less than about 140.

Conveniently, the compositions of the invention are non-flammable as determined by ASHRAE Standard 34:2019. For example, the compositions of the invention are non-flammable at a test temperature of 60° C. using the ASHRAE-34 methodology. Advantageously, the mixtures of vapour that exist in equilibrium with the compositions of the invention at any temperature between about −20° C. and 60° C. are also non-flammable.

It is believed that the compositions of the invention exhibit a completely unexpected combination of low/non-flammability, low GWP, improved lubricant miscibility and improved performance properties when used in refrigeration systems, especially in air-conditioning systems. Some of these properties are explained in more detail below.

Typically, the compositions of the present invention have a coefficient of performance (COP) which is greater than or about equal to that of $CO_2$.

Conveniently, the compositions of the present invention have a temperature glide in a condenser or an evaporator of less than about 11K, such as less than about 9K, for example less than about 7K.

Advantageously, the compositions of the invention have a volumetric refrigeration capacity which is within about 25% of that of $CO_2$, such as within about 20%, for example within about 15%.

Typically, the compositions of the invention have an operating pressure in a condenser or an evaporator which is lower than that of $CO_2$.

The compositions of the invention are typically suitable for use in existing designs of equipment and are believed to be compatible with all classes of lubricants and currently used with established HFC refrigerants. They may be optionally stabilized or compatibilized with mineral oils by the use of appropriate additives.

Preferably, the lubricant is selected from mineral oil, silicon oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof, preferably wherein the lubricant is selected from PAGs, POEs and combinations thereof.

Conveniently, a stabiliser is selected from diene-based compounds, phosphates, phenol compounds and epoxides, and mixtures thereof.

In another aspect of the present invention, there is provided a use of a composition of the present invention as a working fluid in a heat transfer system.

Typically, the heat transfer system is a refrigeration, heat pump or air-conditioning system.

Preferably, the refrigeration system comprises a commercial refrigeration system (such as a supermarket display refrigeration system, beverage cooler refrigeration system, warehouse refrigeration system or a cold-room refrigeration system), or a transportation refrigeration system (for example a refrigeration system fitted to a refrigerating shipping container or a refrigeration system fitted to a vehicle).

Conveniently, the heat pump system comprises a water heater heat pump system.

Preferably, the air-conditioning system comprises a transportation air-conditioning system, such as a bus, car, train or truck air-conditioning system.

Advantageously, the heat transfer (e.g. refrigeration, heat pump and/or air-conditioning) systems defined above operate as transcritical heat transfer systems for at least part of the year.

In some of the applications of transcritical cycle technology, a vapour compression cycle used is a single compression cycle as is typical in mobile air-conditioning applications. In other applications, the gas compression is carried out in two stages, which permits efficient operation over a large temperature difference between heat source and heat sink temperatures. It is believed that the compositions of the invention are suitable for use in a single and dual compression stage cycles.

In one aspect of the present invention, there is provided a use of the composition of the invention as an alternative for an existing working fluid in a heat transfer device, such as a new heat transfer device designed to meet the same application requirements.

Conveniently, the existing working fluid is R-410A. Alternatively, the existing working fluid may be R-407C.

In another aspect of the present invention, there is provided a heat transfer device comprising a composition of the present invention.

Preferably, the heat transfer device is a transcritical heat transfer device, such as a transritical refrigeration, heat pump or air-conditioning device.

Optionally, the transcritical heat transfer device comprises an internal heat exchanger (IHX) system.

The transcritical heat transfer device may also comprise a liquid accumulator positioned after the evaporator, or, if the IHX is present, between the evaporator and the IHX.

According to another aspect of the invention, there is provided a method of producing heating which comprises condensing a composition of the invention in the vicinity of a body to be heated.

According to another aspect of the invention, there is provided a method of producing cooling which comprises evaporating a composition of the invention in the vicinity of a body to be cooled.

All the chemicals described herein are commercially available. For example, fluorochemicals may be purchased from Apollo Scientific (UK).

The compositions of the invention may be prepared by simply mixing $CO_2$, R-32 and $CF_3I$ (and optional components, such as R-1132a and/or a lubricant) in the desired proportions. The compositions can then be added to a heat transfer device or used in any other way as described herein.

The present invention is illustrated by the following non-limiting examples.

EXAMPLES

The vapour liquid equilibrium behaviour of $CO_2$ with $CF_3I$ and with R-32 is described in the academic literature and the available data was used to generate interaction parameters for use with the NIST REFPROP9.1 software. The vapour liquid equilibrium behaviour of $CF_3I$ with R-32 and R-1132a, and of R-1132a with $CO_2$ and R-32 was studied experimentally in the temperature range −40° C. to 70° C. using a constant-volume equilibrium apparatus, and the resulting data also used to fit binary interaction parameters for each binary pair. The principle of measurement of this experimental work was the determination of vapour pressure for a series of known compositions over a range of temperatures, followed by regression to the thermodynamic model to minimise the difference between calculated and observed pressure over the data set.

The interaction parameters thus obtained were used with the NIST REFLEAK5.1 computer program to simulate the fractionation of ternary $CO_2$/R-32/$CF_3I$ mixtures and quaternary R-744/R-1132a/R-32/CF3I mixtures at −40° C. The compositions studied had 1-30% R-32 and the quaternary compositions had up to 15% by weight R-1132a. The initial fill composition for these simulations was taken as 90% of maximum allowable liquid fill, where the allowable liquid fill was calculated according to the requirements of ASHRAE Standard 34 (2019). The fractionation was run from the initial fill to 95% mass loss for each composition.

Modelling of a series of compositions led to the following observations

If the total amount of R-1132a+R-32 in the blend is less than about 35% then the initial vapour and liquid compositions are non-flammable.

If the mass ratio of R-32 to $CF_3I$ in the composition is less than or equal to about 2:1 then the final liquid and vapour compositions will be substantially free of $CO_2$ and R-1132a and will contain less than 58% by weight of R-32, ensuring they will be non-flammable Standard refrigeration cycle modelling techniques were then used to estimate the performance of selected compositions of the invention. The performance of R-744 was also calculated as a comparative example. Where the cycle conditions resulted in the high-pressure side of the cycle operating above the fluid critical temperature (a "transcritical" cycle) then the compressor discharge pressure was varied to optimise the cycle efficiency (Coefficient of Performance—COP). The cycle modelled was a transcritical cycle using an internal heat exchanger (IHX) to exchange heat between the gas leaving the gas cooler and the low-pressure vapour leaving the evaporator.

The following conditions were assumed for the modelling purposes:

TABLE 1

| Model input conditions | | |
| --- | --- | --- |
| Air temperature rise over gas cooler | 10 | K |
| Air on temperature | 33 | ° C. |
| Air off temperature | 43 | ° C. |
| Temperature approach in gas cooler | 4 | K |
| Capacity | 6 | kW |
| Mean evaporation temperature | 7 | ° C. |
| Evaporator superheat | 0 | K |
| Suction line heat gain across IHX | 20 | K |
| isentropic efficiency | 65% | |

The performance data for the selected compositions of the invention is shown in Table 2 below.

It can be seen from the performance data that the compositions of the invention have superior energy efficiency and reduced operating pressures compared to $CO_2$. In addition, the GWP of the compositions is less than about 210.

From the performance data, it can be seen that is not desirable to include more than about 30 weight % R-32 in these compositions because the temperature glide in the evaporator becomes greater than 11K. R-32 content of 21% or lower ensures the GWP of the composition will be lower than 150, which is required for some applications under the EU F-Gas Regulation.

The compositions of the invention can be further augmented by the addition of R-1132a, for example by substitution of a portion of the R-744 content with R-1132a, so that the R-1132a content is between 1% and 15% by weight without generating a flammable composition during fractionation. Addition of R-1132a reduces compressor discharge temperature and reduces the temperature glide in the evaporator. Such compositions also have higher energy efficiency and reduced operating pressures compared to R-744.

propene (R-1234yf) 1,1,1,2,3,3,3-heptafluoropropane (R-227ea) and mixtures thereof.

10. The composition according to claim 9, wherein the composition comprises from about 1 to about 15 weight % of the further component(s).

11. The composition according to claim 1 consisting essentially of the stated components.

12. The composition according to claim 1 wherein the composition is non-flammable as determined in accordance with ASHRAE Standard 34:2019.

TABLE 2

Compositions comprising CO₂, R-32, CF₃I and, optionally, R-1132a.

| | | R744 | | | | | | | | | |
|---|---|---|---|---|---|---|---|---|---|---|---|
| | | 100% | 59% | 58% | 54% | 52% | 55% | 62% | 68% | 70% | 76% |
| | | | | | | R1132a | | | | | |
| | | 0% | 10% | 10% | 15% | 10% | 0% | 0% | 0% | 0% | 0% |
| | | | | | | R32 | | | | | |
| | | 0% | 21% | 21% | 21% | 25% | 30% | 25% | 21% | 20% | 16% |
| | | | | | | CF3I | | | | | |
| | | 0% | 10% | 11% | 10% | 13% | 15% | 13% | 11% | 10% | 8% |
| Coefficient of Performance | | 2.69 | 3.12 | 3.12 | 3.10 | 3.21 | 3.30 | 3.22 | 3.16 | 3.14 | 3.04 |
| Volumetric cooling capacity | kJ/m³ | 14497 | 11646 | 11591 | 11333 | 11288 | 11364 | 11852 | 12208 | 12312 | 12497 |
| Compressor discharge temperature | °C. | 102.6 | 105.6 | 105.9 | 103.7 | 107.7 | 113.5 | 111.8 | 109.7 | 109.0 | 106.5 |
| Evaporator pressure | bar | 41.8 | 28.1 | 27.8 | 27.7 | 25.8 | 24.2 | 26.5 | 28.5 | 29.2 | 31.4 |
| Gas cooler pressure | bar | 90.2 | 62.8 | 62.4 | 61.7 | 58.9 | 56.9 | 61.0 | 64.4 | 65.5 | 68.9 |
| Evaporator glide | K | 0.0 | 7.8 | 8.0 | 7.7 | 9.1 | 10.4 | 9.4 | 8.3 | 7.8 | 6.4 |
| COP | | 100.0% | 116.1% | 116.2% | 115.5% | 119.4% | 122.9% | 120.0% | 117.5% | 116.8% | 113.3% |
| $Q_{vol}$ | | 100.0% | 80.3% | 79.9% | 78.2% | 77.9% | 78.4% | 81.8% | 84.2% | 84.9% | 86.2% |
| GWP | | 1 | 142 | 142 | 142 | 169 | 203 | 169 | 142 | 136 | 109 |

The invention claimed is:

1. A composition comprising:
   (a) from about 70 to about 98 weight % carbon dioxide (CO₂, R-744);
   (b) difluoromethane (R-32); and
   (c) trifluoroiodomethane (CF₃I).

2. The composition according to claim 1 comprising from about 70 to about 95 weight % CO₂.

3. The composition according to claim 1 comprising from about 1 to about 30 weight % R-32.

4. The composition according to claim 1 comprising from about 1 to about 20 weight % CF₃I.

5. The composition according to claim 1, wherein the composition additionally comprises 1,1-difluoroethylene (R-1132a).

6. The composition according to claim 5 comprising from about 1 to about 20 weight % R-1132a.

7. The composition according to claim 5 comprising R-32 and R-1132a in a combined amount of less than about 37 weight %.

8. The composition according to claim 1 comprising R-32 and CF₃I in a weight ratio of R-32 to CF₃I of less than about 2:1.

9. The composition according to claim 1, wherein the composition additionally comprises a further component selected from 1,1,1,2-tetrafluoroethane (R-134a), trans-1,3,3,3-tetrafluoropropene (R-1234ze (E)), 2,3,3,3-tetrafluoro- 13. The composition according to claim 1, wherein the composition has a Global Warming Potential (GWP) of less than about 220.

14. The composition according to claim 1, wherein the composition additionally comprises a lubricant selected from mineral oil, silicon oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

15. The composition according to claim 1, further comprising a stabiliser.

16. The composition according to claim 1 having a coefficient of performance (COP) which is greater than or about equal to that of CO₂.

17. The composition according to claim 1 having a temperature glide in an evaporator of less than about 11K.

18. The composition according to claim 1 having a volumetric refrigeration capacity which is within about 25% of that of CO₂.

19. The composition according to claim 1 wherein the composition has an operating pressure in a condenser or a gas cooler which is lower than that of CO₂.

20. The composition according to claim 1 comprising from about 1 to about 30 weight % R-32, and from about 1 to about 20 weight % CF₃I.

21. A method comprising providing a composition according to claim 1 as a working fluid in a heat transfer system comprising a refrigeration, heat pump or air-conditioning system.

22. The method of claim 21, wherein the refrigeration system comprises a commercial refrigeration system, such as a supermarket display refrigeration system, beverage cooler refrigeration system, warehouse refrigeration system or a cold-room refrigeration system.

23. The method of claim 21, wherein the refrigeration system comprises a transportation refrigeration system, such as a refrigeration system fitted to a refrigerating shipping container or a refrigeration system fitted to a vehicle.

24. The method of claim 21, wherein the heat pump system comprises a water heater heat pump system.

25. The method of claim 21, wherein the air-conditioning system comprises a transportation air-conditioning system, such as a bus, car, train or truck air-conditioning system.

26. The method of claim 21, wherein the heat transfer system operates as a transcritical heat transfer system for at least a part of the year.

27. A method comprising providing a composition according to claim 1 as a replacement for an existing working fluid in a heat transfer device.

28. A heat transfer device comprising a composition as defined in claim 1.

29. The heat transfer device according to claim 28, wherein the heat transfer device is a transcritical heat transfer device comprising a transcritical refrigeration, heat pump or air-conditioning device.

30. A method of producing heating which comprises condensing a composition according to claim 1 in the vicinity of a body to be heated.

31. A method of producing cooling which comprises evaporating a composition according to claim 1 in the vicinity of a body to be cooled.

* * * * *